(12) United States Patent
Dale

(10) Patent No.: US 8,215,216 B2
(45) Date of Patent: Jul. 10, 2012

(54) INTEGRATED BLADE LUBRICATION CONTROLLER

(75) Inventor: Peter Dale, Kilworthy (CA)

(73) Assignee: Norwood Industries Inc., Kilworthy, Ontario (CA)

( * ) Notice: Subject to any disclaimer, the term of this patent is extended or adjusted under 35 U.S.C. 154(b) by 0 days.

(21) Appl. No.: 12/949,848

(22) Filed: Nov. 19, 2010

(65) Prior Publication Data

US 2011/0132165 A1    Jun. 9, 2011

(30) Foreign Application Priority Data

Dec. 8, 2009   (CA) .................................... 2687619

(51) Int. Cl.
*B26D 7/08*   (2006.01)
*B26D 7/10*   (2006.01)

(52) U.S. Cl. ................ 83/169; 83/170; 83/171

(58) Field of Classification Search ............ 83/169, 83/168, 170, 171; 144/2.1, 3.1; 251/7
See application file for complete search history.

(56) References Cited

U.S. PATENT DOCUMENTS

| | | | | |
|---|---|---|---|---|
| 3,097,675 | A * | 7/1963 | Benedict | 83/169 |
| 3,188,010 | A * | 6/1965 | Lee | 239/412 |
| 3,830,122 | A * | 8/1974 | Pearl | 83/169 |
| 3,848,493 | A * | 11/1974 | Harris | 83/168 |
| 4,222,295 | A * | 9/1980 | Sawamura | 83/169 |
| 4,501,181 | A * | 2/1985 | Yakich | 83/169 |
| 4,660,454 | A * | 4/1987 | Elsey | 83/797 |
| 5,062,335 | A * | 11/1991 | Missler | 83/168 |
| 5,213,022 | A * | 5/1993 | Elgan | 83/797 |
| 5,246,088 | A * | 9/1993 | Imai et al. | 184/6.5 |
| 5,265,840 | A * | 11/1993 | Gillespie et al. | 251/4 |
| 5,678,466 | A * | 10/1997 | Wahl | 83/168 |
| 6,000,387 | A * | 12/1999 | Lee | 125/13.01 |
| 6,196,104 | B1 * | 3/2001 | Cloud et al. | 83/661 |
| 6,923,422 | B2 * | 8/2005 | Schmaltz | 251/7 |
| 7,784,387 | B2 | 8/2010 | Dale et al. | |
| 2002/0069738 | A1 * | 6/2002 | Gagne | 83/171 |
| 2005/0081690 | A1 * | 4/2005 | Biro | 83/168 |
| 2006/0117926 | A1 | 6/2006 | Dale et al. | |
| 2007/0234869 | A1 | 10/2007 | Dale et al. | |

FOREIGN PATENT DOCUMENTS

| | | |
|---|---|---|
| CA | 1200180 A1 | 2/1986 |
| CA | 2541734 A1 | 10/2007 |
| DE | 3320761 A1 | 12/1984 |

OTHER PUBLICATIONS

Lumberlite ML26 Mid-Size Band Saw, Norwood Industries, Inc., www.norwoodindustries.com, 2 pages, accessed Dec. 13, 2010.
New LumberLite ML26, Norwood Industries, Inc., www.norwoodindustries.com, 1 page, accessed Dec. 13, 2010.
Lumbermate 2000 Options, Norwood Industries, Inc., www.norwoodindustries.com, 3 pages, accessed Dec. 13, 2010.
Office Action issued on Jul. 23, 2010 in CA Application No. 2,687,619.

* cited by examiner

*Primary Examiner* — Ghassem Alie
*Assistant Examiner* — Bharat C Patel
(74) *Attorney, Agent, or Firm* — Panitch Schwarze Belisario & Nadel LLP

(57) ABSTRACT

A blade lubrication system for a sawmill having a blade, chain or band saw, and a control mechanism for activating said blade, chain or band. The blade lubrication system automatically activates cooling and cleaning of the blade, or band when the control mechanism is activated, and automatically deactivates the cooling and cleaning of the blade, chain or band when the control mechanism is deactivated.

4 Claims, 7 Drawing Sheets

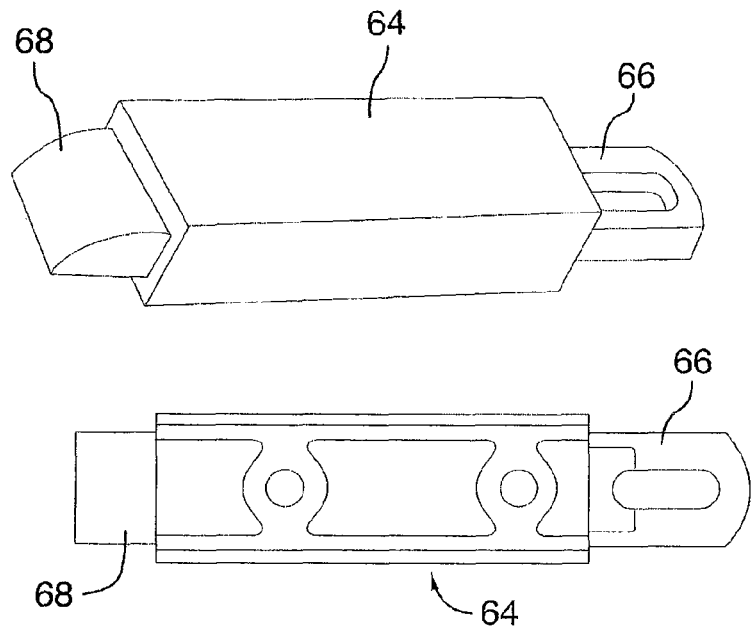
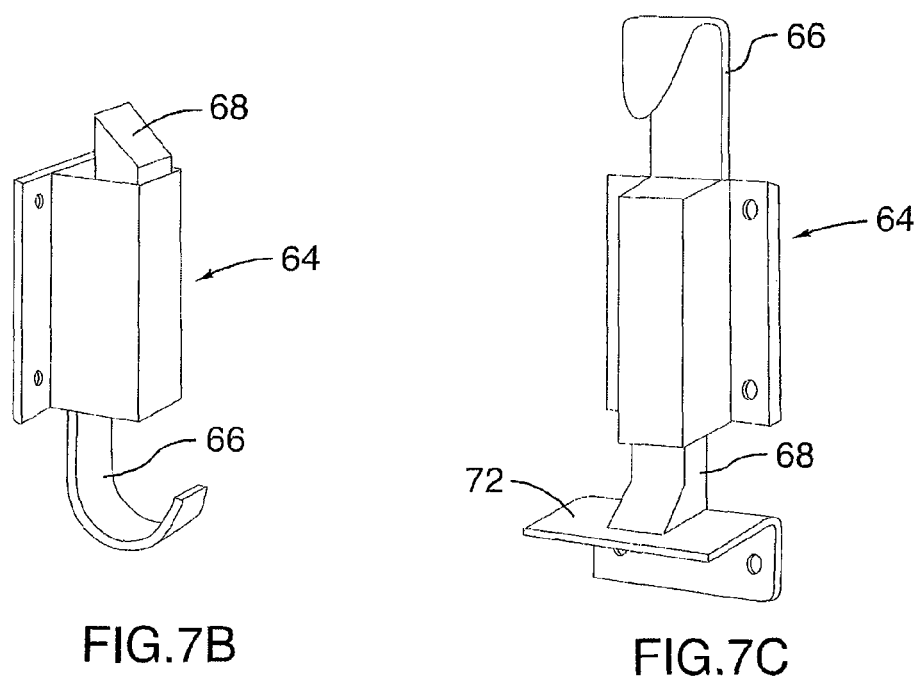
FIG.7A
FIG.7B FIG.7C

INTEGRATED BLADE LUBRICATION CONTROLLER

BACKGROUND OF THE INVENTION

The present invention relates to an integrated blade lubrication controller for a sawmill such as a portable sawmill having a cutting mechanism for sawing lumber. The integrated blade lubrication controller is linked to the throttle controller, so that lubricant is applied to the saw blade only when the throttle is deployed.

There are several prior inventions for portable sawmills.

U.S. Pat. No. 5,784,941 describes a portable sawmill in which the functions of adjusting a cut and making a cut are divided between two separate devices. The invention discloses a vertical chain saw, ideally operated in an upward direction, which moves horizontally along a track. The device has a throttle actuator, that, in conjunction with a chain, operates the throttle of the chain saw, so that the motor of the chainsaw is at full power when cutting, but returns to idle when not cutting. A cooling system is not disclosed.

U.S. Pat. No. 4,275,632 describes a portable sawmill comprising a U-shaped support or carriage, holding a band saw. When in use, a log is placed between the two guide rails and is supported in place by a jacking mechanism with adjustable shelves. The band saw is in a generally horizontal position (though with one end slightly elevated), and does not adjust in a vertical direction; instead, the log itself is moved up and down using a jacking mechanism. The band saw is equipped with a release mechanism for automatically disengaging the drive between the motor and the saw at the end of a cutting stroke. Though the band saw does not have a throttle mechanism per se, the band saw has a lever which can be latched in position in which an idler pulley engages the belt causing power to be transmitted to the band saw. Once the band saw carriage has passed entirely through the log to be sawed, the latch strikes against a top plate, causing the latch to disengage the lever and stop the band saw through disengagement of an idler pulley with the band saw belt. A cooling system is not disclosed.

U.S. Pat. No. 4,235,140 describes a sawmill having a saw carriage having a vertical slide slidable on a vertical post of the sawmill frame, and adjustable vertically thereof by a cable secured at its upper end to a hook hooked into the top of the post. The lower end of the cable is attached to a reel, rotatable by a manual crank. The sawmill is equipped with a handle having a Bowden-wire control to the throttle of the chain saw, such that the chain saw internal throttle mechanism can be activated and controlled from the handle. A cooling system is not disclosed.

U.S. Pat. No. 3,965,788 describes a saw guide for use with a vertically operated portable chain saw. The saw guide comprises support means for the chain saw, to which the saw is attached. The vertical displacement of the chain saw along the support means is by way of a slidable engagement which can be clamped to a desired height using adjusting clamps. The operator uses the chain saw's built in trigger and internal throttle mechanism to operate the chain saw. A cooling system is not disclosed.

U.S. Pat. No. 3,926,086 describes a portable sawmill that uses a complex pulley system to move the chain saw and supporting platform in a horizontal direction. Vertical displacement of the chain saw relative to the log and sawmill frame is through a pair of transversely-spaced vertically-movable racks having their lower ends operatively connected to the bar of the chain saw, a transverse shaft rotatably mounted on the frame, and a pair of transversely-spaced pinions fastened to the shaft and engaging the tracks. The racks and the attached chain saw is raised or lowered relative to the frame and to the log by rotation of the shaft. The chain saw is disclosed to have a pivotal throttle trigger which may be squeezed to adjust the speed of the operating saw between a relatively slow idle speed and a relatively fast cutting speed. The portable sawmill may also have trigger disengagement means engaging the chain saw throttle trigger and operative to cause the saw to return to an idle speed when the trigger deactivating means strikes an object as the cutting saw exits a log being sawed. The trigger disengagement utilizes a detent mechanism on the chain saw trigger, so that the trigger disengagement further depresses the throttle trigger so that the detent is disengaged, snapping the throttle trigger outwardly to its extended position, and returning the operating saw to its idle speed when the saw exits a log being sawed. A cooling system is not disclosed.

Canadian Patent No. 1,200,180 describes a portable sawmill comprising a frame with a guide rail and a carriage moveable along the guide rail. A band saw is supported by the carriage. The carriage is moveable along the guide rail along two sets of wheels, one engaged with the upper side of the guide rail and the other with the lower side. The patent discloses a single lever control which enables the operator to positively engage or brake the band saw, and also to control the engine throttle. Specifically, a brake, a clutch, and a power speed control are all incorporated into a single lever which is actuated at the end of each cut to stop the band saw blade and to lower or stop power velocity. A cooling system is not disclosed.

U.S. Pat. No. 4,210,049 describes an "x" frame for holding a log, with a chain saw affixed to the frame in cantilever position for cutting logs crosswise. The frame comprises a throttle control means including a fingertip throttle control lever pivoted to the end of a handle, and a corresponding lever pivoted at the base end, the levers being connected by a link and the lever being integral with a horizontal crank element so that its end actuates the chain saw throttle when the lever is actuated. A cooling system is not disclosed.

The LumberLite™ 24 mid-size band sawmill and the Lumbermate 2000 full size portable band sawmill (http://www.norwoodindustries.com) are portable sawmills having two horizontal bases, each with a wheel assembly providing planar horizontal movement and fitted onto a set of rails of a sawmill base, two vertical saw supports extending vertically from the horizontal bases, and a top cross rail connecting the two vertical saw supports. The sawmills have a cable rod extending between the vertical saw supports, with a crank handle. The crank handle rotates the cable rod. The saw head is placed below the cable rod and slidably affixed to the vertical saw supports such that it can move vertically along the two vertical saw supports. A cable extends between the cable rod and the saw head, and reels around the cable rod, lifting or lowering the saw head. The saw head is kept in place using clamps on the saw head affixing it to the vertical saw supports. The saw head is displaced horizontally along the rails by pushing a handle. The handle has a lever which acts as a throttle control; the lever is connected to the saw head throttle through a Bowden cable. Thus, by squeezing the lever towards the handle, the throttle is activated. By releasing the lever (which is biased in an outwards position) the throttle is released. The LumberLite™ can be purchased with a saw blade/band cooling system, which consists of a flexible hose affixed to the saw head carriage in a manner such that, when water is run through the hose, it falls onto the saw blade/band. Thus, an operator would connect the opposing end of the hose to a water supply, such as a water tap, and would turn on the water tap before making each cut. The operator would then turn off the water tap, either after each cut, or when finished utilizing the sawmill.

Many sawmills, including the aforementioned sawmills, work better when the saw blade, saw band, or saw chain (as appropriate) is kept cool. This helps keep the blade pitch-free, improves cutting performance, and extends the life of the blade, band or chain. Thus, many sawmills are retro-fitted, or modified, to have a blade lubrication system. Others are sold pre-equipped with a blade lubrication. Essentially, as discussed above with respect to the LumberLite™, the operator affixes one end of a hose, such as a rubber hose to a location proximal to the saw blade, saw band, or saw chain; the other end of the hose is attached to a water/lubricant supply, such as a container or cold water tap. Before use, the operator turns on a valve on the hose, which, in turn, releases water from the hose and onto the saw blade/band/chain, lubricating the blade/ban/chain. In order to conserve water and minimize a muddy or wet cutting environment, typically, the operator will turn the water off after cutting the log, will re-adjust the sawmill for the next cut, then will turn the water back on before starting the next cut. This adds steps, and time, to the log cutting. The existence of these steps also introduces the opportunity for operator error—the operator may forget to turn the water on, resulting in the blade or band overheating, or forget to turn the water off, resulting in mud or flooding.

There is therefore a need for an improved portable sawmill having a blade lubrication system that automatically activates when the saw is in use, and deactivates when the saw is not in use. Such a blade lubrication system would preferably be simple and reliable.

BRIEF SUMMARY OF THE INVENTION

The present invention provides a blade lubrication system for a sawmill, having a hose having a saw end and a tap end, whereby the tap end is capable of being affixed to a blade lubricant source. The hose is sufficiently malleable, elastic or flexible to allow clamping or restriction of water/blade lubricant flow within said hose by applying pressure to an external surface of said hose. A control is positioned such that it is capable of applying sufficient pressure to the external surface of the hose to restrict blade lubricant flow within said hose. The control is biased in a first configuration whereby sufficient pressure is applied to the external surface of the hose to restrict blade lubricant flow. The control also has a second configuration wherein blade lubricant flow is not restricted. The saw end of said hose can be positioned so that blade lubricant flowing out of said saw end cools and cleans a blade or band chain of a saw of said sawmill. The control can be attached to the sawmill such that the control is moved into said second configuration when the saw is activated by a user.

Typically, the blade lubricant is water and the blade lubricant source is a water tap or blade lubrication reservoir.

The control can be a slam latch, having a bolt biased in an outward direction when the slam latch is in the first configuration; and a pull attached to the sawmill such that, when the pull is displaced, the bolt moves in a direction causing the slam latch to move into said second configuration. In a preferred embodiment, the control also has a cable having a first end attached to said pull, and a second end attached to a throttle control on said sawmill, wherein, when said throttle control is activated, the first end of said cable displaces said pull to move said slam latch to said second configuration.

The present invention also teaches sawmills having the blade lubrication system of the invention.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIG. 7 shows, in FIGS. 7A, 7B, and 7C, respectively, three different latches, each in isolation, each that can be utilized to control flow of water in the sawmill.

DETAILED DESCRIPTION OF THE INVENTION

The present invention provides a simple, versatile, cost-effective and portable sawmill which can be readily assembled, disassembled, carried, and used by one person. It is particularly suitable for use by hunters, "do-it-yourselfers", and people situated in remote areas, who need to saw boards, clapboards, shingles, etc. The sawmill's design enables it to be manufactured from extremely sturdy, reasonably inexpensive materials.

While there are several prior inventions for portable sawmills, none provide the advantages of the present invention, which has several inventive features not found in the prior art. Notably, the present invention provides an improved blade lubrication mechanism for sawmill blades, bands or chains (collectively referred to as sawmill blades for ease of reference, throughout the remainder of this document). The blade lubricating mechanism is triggered in conjunction with the triggering of the saw throttle, such that the blade is lubricated only when it needs to be, i.e., when the throttle is on (and, typically, the blade is cutting a log). The invention provides a simple and elegant solution, using off-the-shelf parts that are known to be reliable and essentially maintenance free.

An embodiment of the present invention will now be described as shown in FIGS. 1-7.

Figure 1:
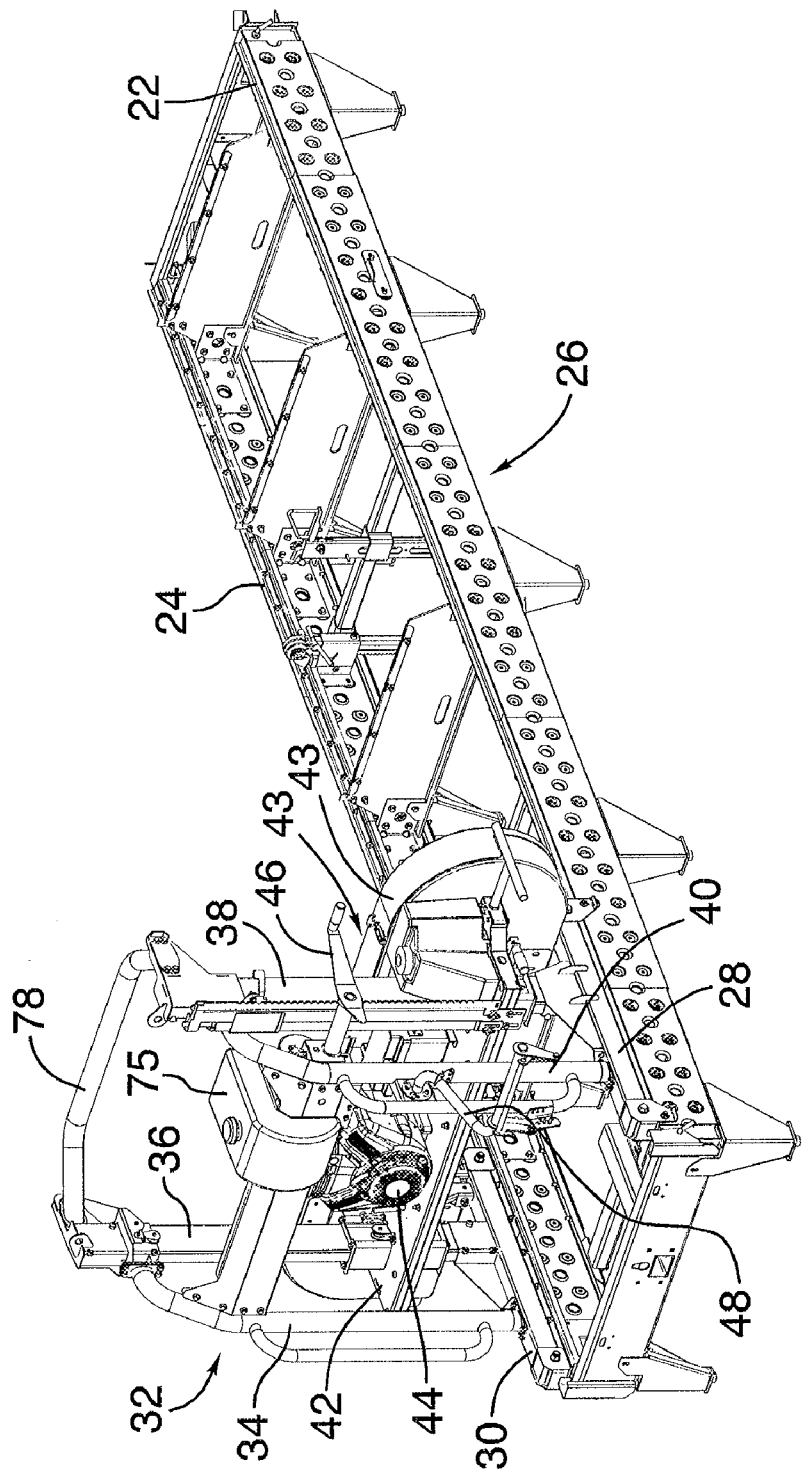
FIG. 1 is a rear right perspective view of a sawmill according to one aspect of the present invention, and is labeled with its major components.
Figure 2:
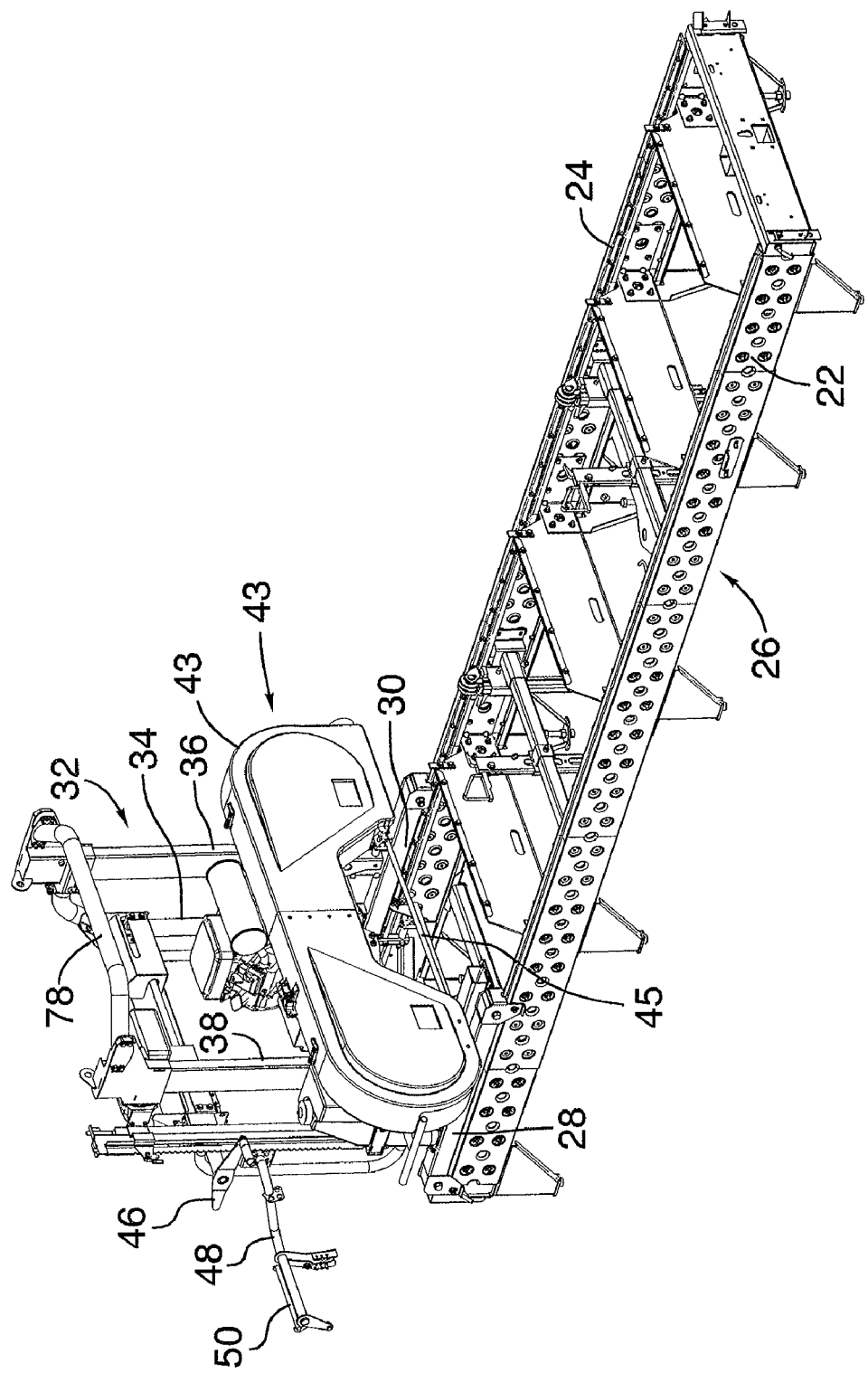
FIG. 2 is a front right perspective view of the sawmill of FIG. 1.

FIGS. 1 and 2 are perspective views of a sawmill according to one aspect of the present invention. FIGS. 1 and 2 show the entire sawmill, with a basic configuration as follows.

Carriage 32 is supported on two horizontal bases 28, 30 which can be longitudinally displaced on the sawmill base 26 along rails 22, 24 (respectively), utilizing wheels (not shown). Mounted onto horizontal bases 28, 30 and extending upwards in a generally vertical direction are vertical supports 34, 36, 38, and 40, with vertical supports 34, 36 mounted onto horizontal base 30 and vertical supports 38, 40 mounted onto horizontal base 28. Cross rail 78 extends between the top of vertical support 36 and 38. Bases 26, 28, vertical supports 34, 36, 38, 40, and cross rail 78 form carriage 32 which can be longitudinally displaced, and which supports sawhead platform 42. Sawhead platform 42 can be displaced in a vertical direction along vertical supports 38, 36 using a variety of means; as shown, using a crank 46 attached to a rod (not shown) which acts as a reel for a cable (not shown) connected to saw head platform 42.

In the illustrated embodiment, sawhead platform 42 supports sawband cover 43 which houses sawband 45. Sawband 45 is rotated by motor 44 when motor 44 is activated. Of course, a person of skill in the art would realize that sawhead platform 42 could utilize a wide variety of saw heads; though a band saw is illustrated, an appropriate reciprocal saw, chain saw, or circular saw may also be used.

Handle 48 is used to displace the carriage 32 (and, as a result, sawhead platform 42) longitudinally along the sawmill base 26. In use, but not shown, a log would be placed longitudinally on sawmill base 26, and affixed in place using conventional means, such as log dogs or clamps. Thus, when the saw is operated, the longitudinal displacement of carriage 32 using handle 48 will cut longitudinal planks out of the log. The operator of the sawmill would adjust the vertical placement of saw head platform 42 to a desired height, then displace the carriage 32 along the sawmill base 26 by pushing or pulling (typically, and as shown, pushing) on handle 48. Once the log is cut, the operator would adjust the vertical placement of saw head platform 42 down a desired distance, and perform a second cut. The operator can cut the entire log, or at least a large portion of it, in this manner.

Figure 3:
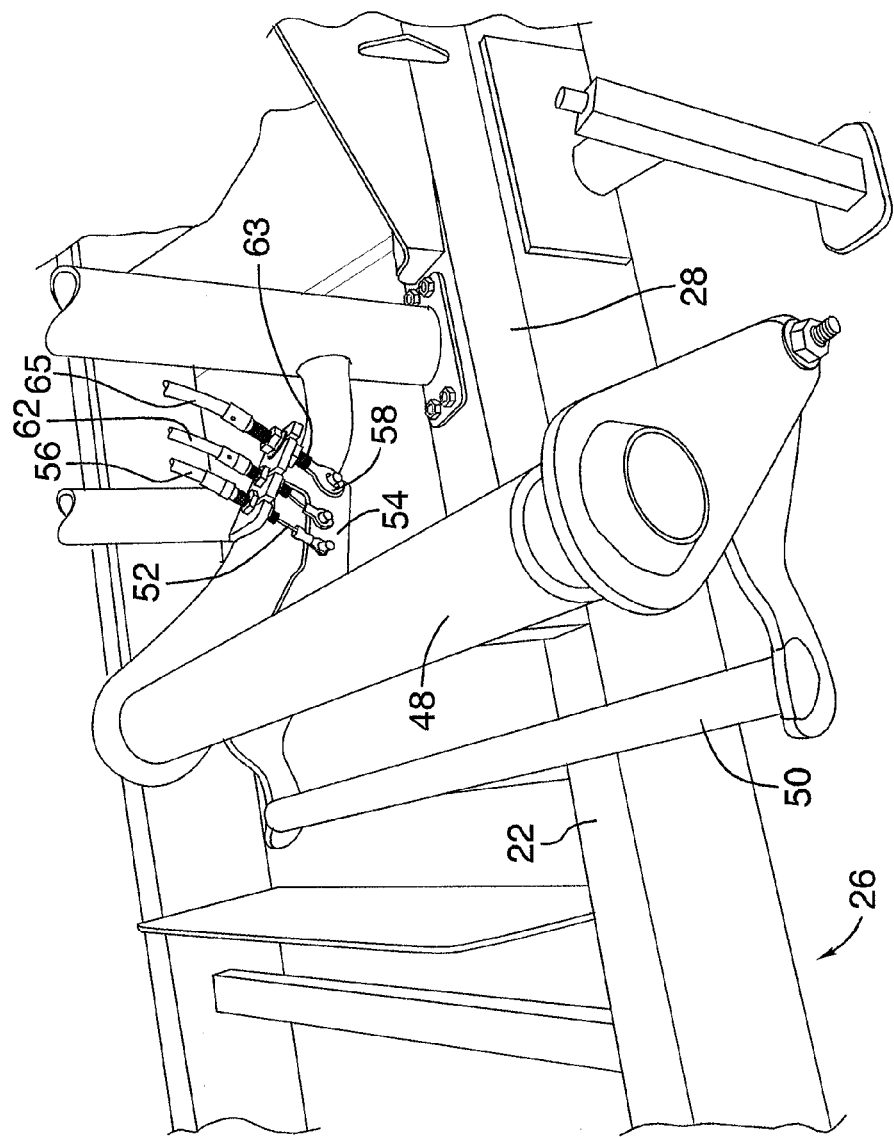
FIG. 3 is a close-up of a handle of a sawmill according to a further aspect of the present invention.

Handle 48 is shown in more detail in the photograph of FIG. 3. Handle 48 has attached thereto throttle control 50. Throttle control 50 is generally parallel to handle 48, and is pivotable thereto in a manner such that it can be squeezed towards handle 48 by an operator. Throttle control 50 is biased in an outward orientation, but is pivotable about a pivot point 60 whereby, as throttle control 50 is squeezed towards handle 48, lever 54, which is on the opposing end of throttle control 50, moves away from handle 48. The throttle control 50 is biased by means of a Bowden cable: spring cable 63, located within spring cable sheath 65, and attached to a spring (not shown). A spring on a slam latch (described in more detail below) at the other end of the cable forces the control 50 back open again when released. Attached to lever 54 are at least two additional Bowden cables, described as follows:

Throttle inner cable 52, encased in throttle cable sheath 56, has a lever end attached to lever 54. The distal end of throttle inner cable 52 is attached to the band saw motor 44 such that it activates the band saw throttle (not shown). As is the well understood mechanism of Bowden cables, when throttle control 50 is squeezed towards handle 48, the throttle inner cable 52 is displaced relative to throttle cable sheath 56, and the distal end of the throttle inner cable 52 is displaced. The distal end of throttle inner cable 52 is attached to throttle (not shown) such that, when the throttle inner cable 52 is displaced in this manner, the throttle is activated and the saw band 45 rotates at a speed for cutting wood.

Blade lubrication inner cable 58 is also encased in blade lubrication cable sheath 62 which also has a lever end attached to lever 54. When throttle control 50 is squeezed towards handle 48, blade lubrication inner cable 58 is also displaced relative to blade lubrication cable sheath 62, generally transmitting a pulling force to the distal end of blade lubrication inner cable 58.

Figure 4:
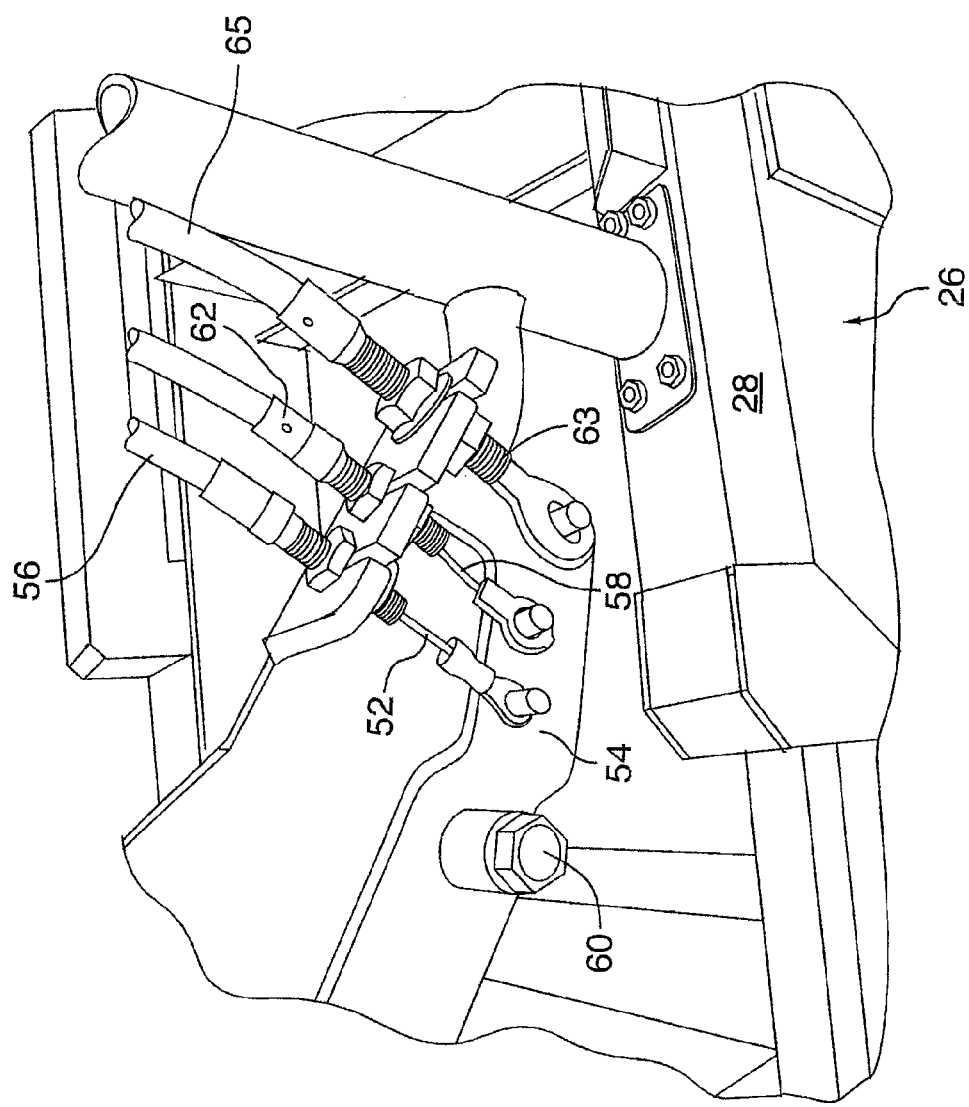
FIG. 4 is a further close-up of the handle of FIG. 3, showing the throttle and water cables in more detail.

FIG. 4 is a close-up of lever 54, showing throttle inner cable 52, throttle cable sheath 56, inner cable 58, and cable sheath 62, as they relate to lever 54 and handle 48. Also shown is pivot point 60, spring cable 63, and cable sheath 65 [63 and 65 are not spring cables. The cables activate the mechanical clutch mechanism in the same way that the throttle cable and blade lubrication cable activate their respective systems. The spring action which restores throttle control to its neutral position are integral to the systems that the cables activate.

Figure 5:
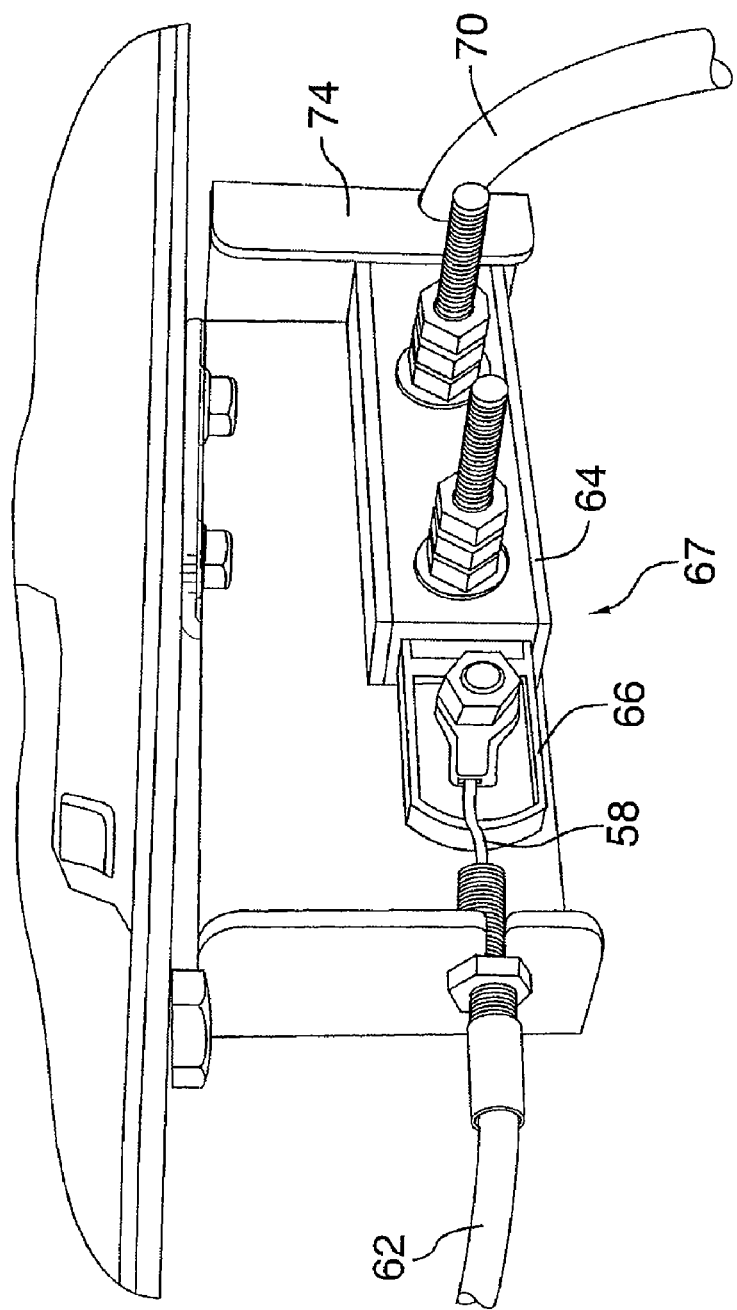
FIG. 5 is a close up of a further element of the sawmill of FIG. 3, showing the water hose and the opposing end of the water cable.
Figure 6:
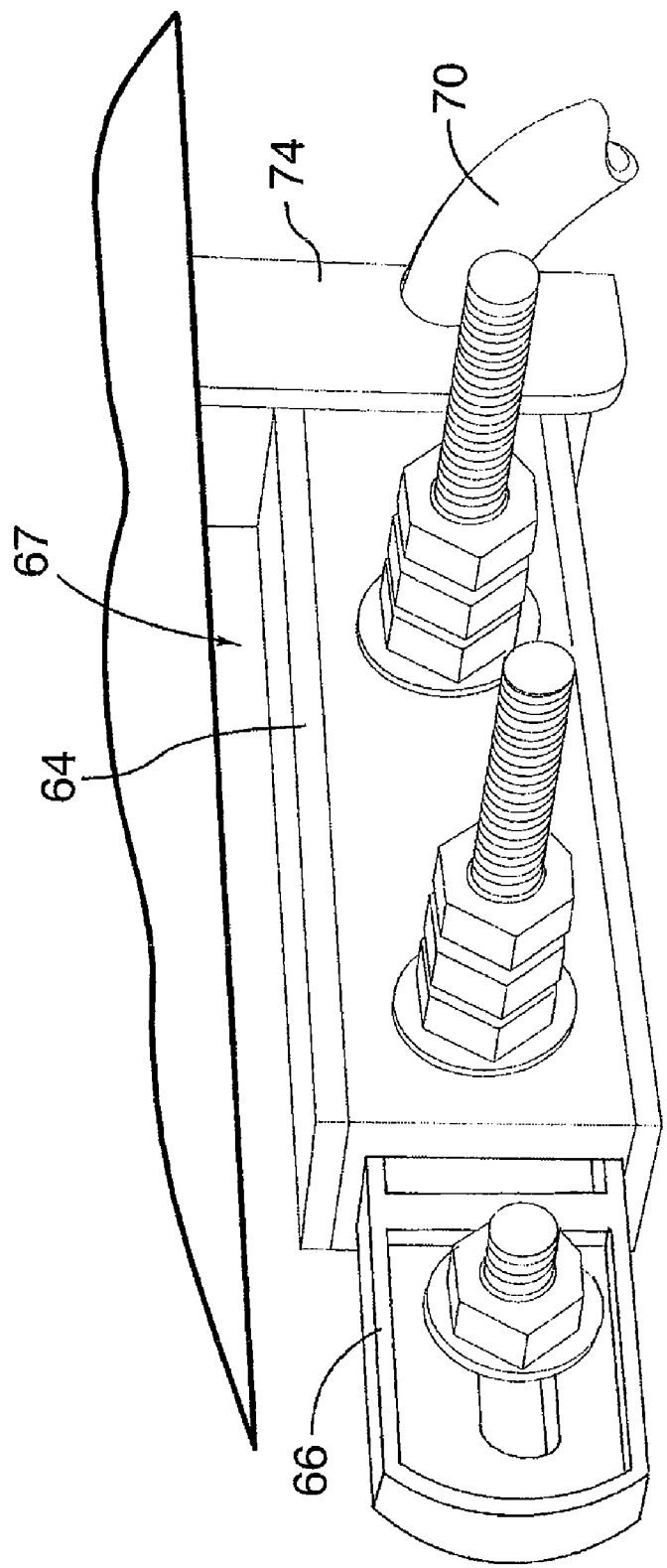
FIG. 6 is a further close up of the sawmill of FIG. 5.

FIGS. 5 and 6 show close-ups of blade lubrication controller 67. Blade lubrication controller 67 can be located almost anywhere on the sawhead platform 42 or carriage 32, so long as it doesn't interfere with the operation of the sawmill. For example, blade lubrication controller 67 can be located on sawhead platform 42, vertical support 38, or on sawband cover 43. A hose conduit 74 within controller 67 houses hose 70. One end of blade lubrication hose 70 is attached to a blade lubrication source, such as a water tap (not shown) or preferably a blade lubricant reservoir (and insert identifier number). The other end of blade lubrication hose 70 is affixed to the sawhead platform 42 or carriage 32 such that, when blade lubricant emerges, the blade lubricant contacts saw band 45, cooling and cleaning the saw band 45 and keeping the blade pitch free. Conduit 74, in general, affixes blade lubrication hose 70 in place without significantly restricting blade lubrication flow within it. Blade lubrication controller 67 also comprises means for clamping or restricting blade lubrication flow within blade lubrication hose 70. Such means are biased such that blade lubricant flow within blade lubrication hose 70 is restricted. The means for clamping or restricting blade lubricant flow within blade lubrication hose 70 are connected to the distal end of blade lubrication cable 58 such that, when a pulling force is transmitted to the distal end of blade lubrication cable 58, blade lubricant controlling means allow blade lubricant to flow within blade lubrication hose 70. As would be understood by a person of skill in the art, blade lubrication hose 70 must be sufficiently malleable, elastic or flexible to allow clamping or restriction of blade lubricant flow by applying pressure to its external surface.

As shown, the blade lubricant controlling means comprise a simple, commercially available slam latch 64, having pull 66 and bolt 68. Bolt 68 is spring biased in an outwards configuration. When pull 66 is pulled in an outwards direction, bolt 68 moves inwards, into the body of slam latch 64. Slam latch 64 is affixed to blade lubrication controller 67 in a configuration such that bolt 68 clamps blade lubrication hose 70 in its natural, biased state, but, when pull 66 is pulled in an outwards direction, bolt 68 moves inwards into the body of slam latch 64 and blade lubrication hose 70 becomes unclamped, allowing blade lubricant to flow. Distal end of blade lubrication inner cable 58 is attached to pull 66, such that, when throttle control 50 is squeezed towards handle 48, pull 66 is pulled in an outwards direction.

While the embodiment shown in the Figures utilizes a spring biased bolt, it will be appreciated that other means, such as a lever, pedal, or cam could be utilized to control the blade lubricant/water flow.

Thus, when throttle control 50 is squeezed towards handle 48, the saw throttle is activated and the saw band 45 begins to turn at a speed for cutting wood. At the same time, blade lubrication controller 67 is activated, and blade lubricant begins to flow to cool and clean the saw band 45. At the end of the cut, the operator releases the throttle control 50 the saw band stops. At the same time, blade lubricant stops flowing to the saw band. In this manner, the cooling and cleaning of the saw band is synchronized with the operation of the saw, minimizing waste and automatically starting, and stopping, the blade lubrication flow at appropriate times.

Further examples of simple, commercially available slam latches (see, e.g. Spaenaur Co. catalogue, 2009) that can be used are seen in isolation in FIG. 7A-C. Note that the slam latch of FIG. 7C further features a strike plate 72; if a slam latch with a strike plate 72 is utilized, as would be understood by a person of skill in the art, the blade lubrication hose 70 would be positioned between bolt 68 and strike plate 72.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A blade lubrication system for a sawmill, comprising:
    a hose having a saw end and a tap end, whereby the tap end is capable of being affixed to a blade lubricant source;
    said hose being sufficiently malleable, elastic or flexible to allow clamping or restriction of blade lubricant flow within said hose by applying pressure to an external surface of said hose;
    a control comprising a spring, said control capable of applying sufficient pressure to an external surface of the hose to restrict blade lubricant flow within said hose;
    wherein said control is biased in a first configuration whereby sufficient pressure is applied to the external surface of the hose to restrict blade lubricant flow;
    wherein said control has a second configuration wherein blade lubricant flow is not restricted;
    wherein said saw end of said hose is positioned so that blade lubricant flowing out of said saw end cools and cleans a blade or band chain of a saw of said sawmill;
    wherein said control is attached to the sawmill such that the control is moved into said second configuration when a saw throttle controller is activated by a user; and
    wherein the control further comprises a cable having a first end attached to a pull, and a second end attached to said saw throttle controller on said sawmill, wherein, when said saw throttle controller is activated, the first end of said cable displaces said pull to move said control to said second configuration.

2. The blade lubrication system of claim 1 wherein the blade lubricant is water and the blade lubricant source is a water tap or blade lubrication reservoir.

3. The blade lubrication system of claim 1, wherein the control is a slam latch having a bolt biased in an outward direction when the slam latch is in the first configuration; and said pull is attached to the sawmill such that, when the pull is displaced, the bolt moves in a direction causing the slam latch to move into said second configuration.

4. A sawmill, comprising:
    a sawmill base extending in a generally horizontal direction and having at least one rail;
    a sawmill carriage capable of displacement in relation to said rail;
    said sawmill carriage having at least one vertical support extending in a generally vertical direction from said base and supporting a saw head capable of vertical displacement along said vertical support;
    said saw head having a blade, chain or band capable of sawing wood;
    a saw throttle controller for said saw head allowing an operator to activate or deactivate said blade, chain or band; and
    a blade lubrication system comprising:
        a hose having a saw end and a tap end, whereby the tap end is capable of being affixed to a blade lubricant source;
        said hose being sufficiently malleable, elastic or flexible to allow clamping or restriction of blade lubricant flow within said hose by applying pressure to an external surface of said hose;
        a control comprising a spring, said control capable of applying sufficient pressure to an external surface of the hose to restrict blade lubricant flow within said hose;
        wherein said control is biased in a first configuration whereby sufficient pressure is applied to the external surface of the hose to restrict blade lubricant flow;
        wherein said control has a second configuration wherein blade lubricant flow is not restricted;
        wherein said saw end of said hose is positioned so that blade lubricant flowing out of said saw end cools and cleans a blade or band chain of a saw of said sawmill;
        wherein said control is attached to the sawmill such that the control is moved into said second configuration when the saw throttle controller is activated by a user; and
        wherein the control further comprises a cable having a first end attached to a pull, and a second end attached to said saw throttle controller on said sawmill, wherein, when said saw throttle controller is activated, the first end of said cable displaces said pull to move said control to said second configuration;
    wherein the saw end is positioned so that the blade lubricant flowing from said saw end contacts said blade, chain or band.

* * * * *